March 22, 1966 M. E. NOVACK ETAL 3,242,354
ANISOTROPIC WALL STRUCTURE, PARTICULARLY FOR AN MHD GENERATOR
Filed April 8, 1963 2 Sheets-Sheet 1

MARTIN E. NOVACK
ROBERT H. RUSSELL
*INVENTORS*

BY Alden P Redfield
Abraham Ogman
ATTORNEYS

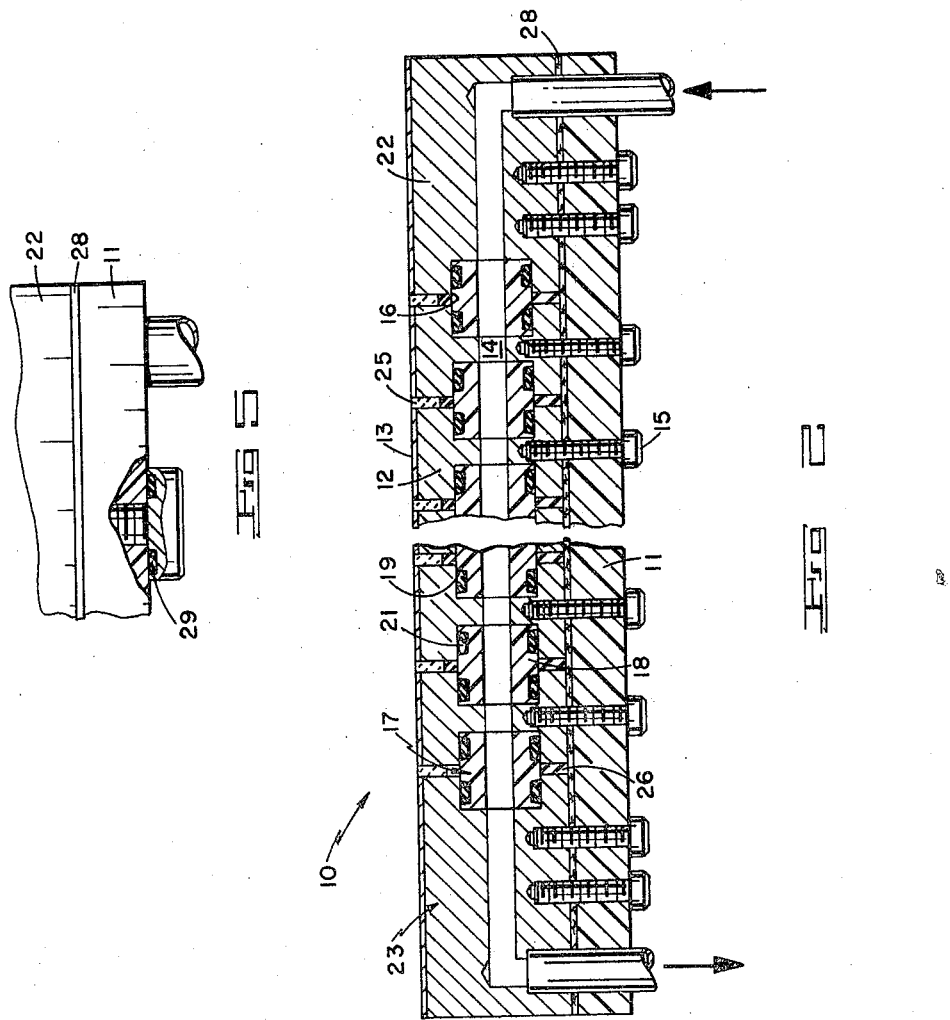

United States Patent Office 3,242,354
Patented Mar. 22, 1966

3,242,354
ANISOTROPIC WALL STRUCTURE, PARTICULARLY FOR AN MHD GENERATOR
Martin E. Novack, Brighton, and Robert H. Russell, South Acton, Mass., assignors to Avco Corporation, Cincinnati, Ohio, a corporation of Delaware
Filed Apr. 8, 1963, Ser. No. 271,288
5 Claims. (Cl. 310—11)

This invention relates to a thermally and electrically anisotropic wall structure (hereinafter referred to as an anisotropic wall structure) and in particular to a wall structure which is useful in magnetohydrodynamic generators.

Reference is made to patent application No. 65,216, filed on October 26, 1960, in the name of Thomas R. Brogan and assigned to the same assignee. In the reference application, the thermal and electrical characteristics of magnetohydrodynamic (MHD) generators are fully discussed. The thermal and electrical problems associated with constructing a suitable wall for confining extremely high temperature, electrically conductive gases are also described.

MHD generators may advantageously be used in conjunction with conventional steam turbine generating systems. The steam turbine generating system utilizes the exhaust products from the MHD generator to improve the efficiency particularly with respect to the efficient utilization of the heat energy not used by the MHD generator. An extensive discussion concerning MHD generators operating in combination with a conventional steam turbine system is provided in patent application entitled "Magnetohydrodynamic Power Plant" filed February 15, 1960, by Kantrowitz and Brogan, Serial No. 8,566, and assigned to the same assignee.

It is an object of the invention to provide an anisotropic wall structure which avoids the limitations and disadvantages of prior anisotropic wall structures.

It is yet another object of the invention to provide an anisotropic wall structure which utilizes cooling means which may be used directly by conventional steam generating systems.

It is yet another object of the invention to provide an anisotropic wall structure which includes a plurality of thermally and electrically insulated thermally conductive wall members.

It is still another object of the invention to provide an anisotropic wall structure in which localized damage may be corrected by localized repairs.

It is still another object of the invention to provide an anisotropic wall structure which includes widely available materials and may be fabricated in a simple and facile manner.

In accordance with the invention, an anisotropic wall structure comprises a plate of electric insulation on which a plurality of spaced, thermally conductive members are supported. Opposing ends of the thermally conductive members define in part a surface remote from the plate of electrical insulation. The thermally conductive members are axially aligned in one direction and include axially aligned passages.

The anisotropic wall structure also includes linking means for forming a continuous conduit means in conjunction with the axially aligned passages. The linking means comprises a sleeve of electrically non-conductive material inserted adjacent axially aligned passages. Sealing means is also provided between the thermally conductive members and the linking means to prevent the leakage of fluid from the conduit means formed.

The anisotropic wall also includes electrically non-conductive refractory material disposed between the thermally conductive members for defining a continuous surface in co-operation with the opposing ends of said thermally conductive members. Fluid inlet and outlet means are provided at opposing ends of said conduit means.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 2 is a sectional view of the FIGURE 1 wall structure taken along lines 2—2.

FIGURE 5 is an enlarged view of a portion of FIGURE 2.

Figure 1:
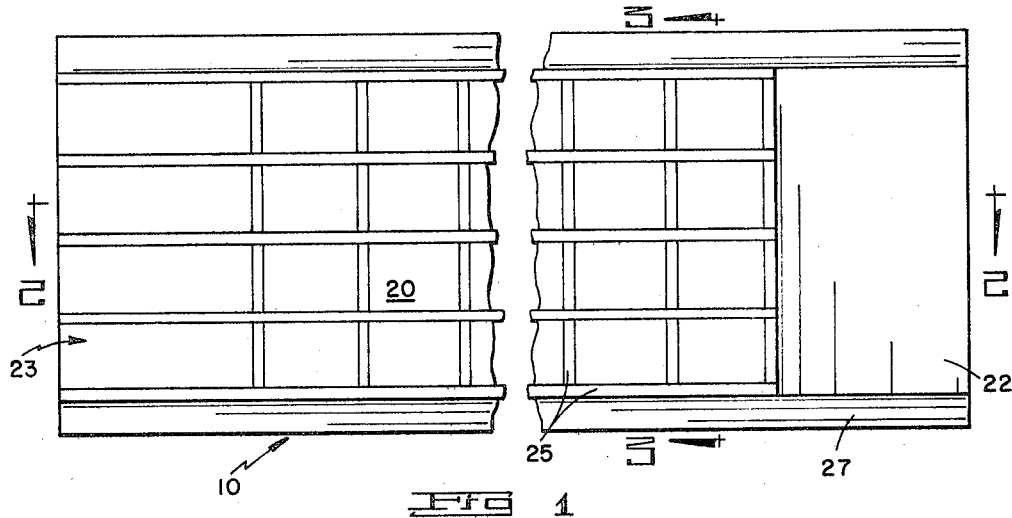
FIGURE 1 is a top view of a thermally and electrically anisotropic wall structure embodying the principles of the present invention.
Figure 3:
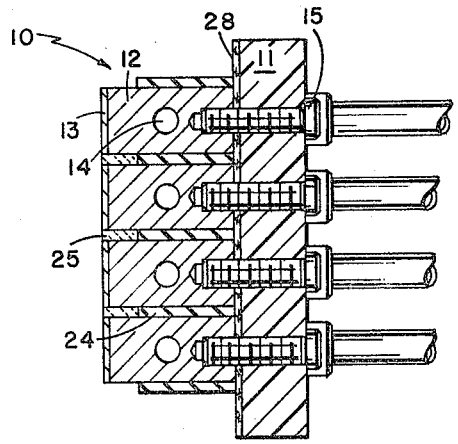
FIGURE 3 is a sectional view of the FIGURE 1 wall structure taken along lines 3—3.

Referring to FIGURES 1-3 of the invention, a thermally and electrically anisotropic wall structure 10 is depicted. The anisotropic wall structure 10 includes a plate of electrical insulation 11 and a plurality of spaced, thermally conductive members 12 supported on the plate 11. The thermally conductive members 12 are secured to the plate 11 by screws 15, see FIGURES 2 and 3. Each thermally conductive member 12 includes an opposing end defined by an abrasion resistant coating 13, such as stainless steel. The opposing ends define, in part, a surface 20 remote from the plate 11.

As seen in FIGURES 1 and 2, the thermally conductive members 12 are axially aligned in at least one direction. Each of the thermally conductive members 12 include an axially aligned passage 14 terminated in enlarged diameter bores 16.

As seen specifically in FIGURE 2, a linking means 17 comprising an electrically non-conductive, usually a plastic, sleeve 18 disposed within adjacent counterbore 16. The sleeves 18 include special circumferential grooves 19 in which are positioned O rings 21 or other suitable sealing means.

It is quite obvious from FIGURE 2 that the axially aligned passages 14 in combination with the sleeves 18 define a continuous conduit means. Fluid input means 22 and fluid output means 23 are coupled to opposing ends of the previously described conduit means substantially as depicted in FIGURE 2.

Disposed between the thermally conducive members are axial spacers 24 (see FIGURE 3) and lateral spacers 26 (see FIGURE 2). The spacers 24 and 26 are formed preferably of a plastic, electrically non-conductive material. These materials need not have refractory properties.

As will be noted in FIGURES 2 and 3, the spacers lie below the surface 20 defined in part by the abrasion resistant coating 13. The surface 20 is made continuous by depositing over the spacers 24 and 26, in the space between the electrically conductive members 12, and electrically insulating refractory material 25 such as alumina, magnesia, chromate, and the like. The refractory material serves to protect the non-refractory spacers 24 and 26 from deterioration and destruction from the extremely high temperatures to which the wall structure is exposed.

Referring to FIGURE 1, extensions 27 of plate 11 are provided for assembling the anisotropic structure 10 with adjacent units. Any other suitable assembly means may be provided.

In FIGURES 1 and 2, it is seen that the fluid inlet means comprises a continuous block of material through which fluid passages are formed. It is also seen that the fluid outlet means comprises segmented members. Since the particular configuration of the anisotropic wall structure 10, as illustrated, was designed for an MHD generator, the fluid inlet end is generally tied to a reference voltage point, such as ground potential. The opposing end 23, or fluid outlet end, of the wall structure must be protected against voltage breakdown and all circulating current effects: it is accordingly segmented.

The loss of the high temperature fluid contained by the anisotropic wall structure 10 is minimized by a gasket 28 between the plate 11 and the thermally conductive members 12. Leakage of fluid may be further prevented by placing O rings 29 on the bolt heads as shown in FIGURE 5.

A fluid channel formed with wall structures, discribed and illustrated, operated satisfactorily in contact with a corrosive 5,000° F. gas over an extended period of time. The temperature of surface 20 did not exceed 700° F. There were no discernible deleterious electrical effects.

A very important consideration in comparing the anisotropic wall structure 10 to other wall structures for high temperature use is the existence of a continuous axially aligned conduit with adequate sealing means between adjacent segments making up the conduit. Accordingly, it is possible to supply a coolant to the anisotropic wall structure 10 under high pressure, 3,000 p.s.i. for example. The relatively hot water exhausting from the anisotropic wall structure may be utilized directly as boiler feed water for high pressure boilers. An overall increase in efficiency is realized.

The diameter of the axially aligned passages, the wall thickness separating these passages from heated surfaces, and the types of material used to form the sleeves are determined by the conditions under which the wall structure will be called upon to operate and will all be obvious to a person skilled in the art.

Figure 4:
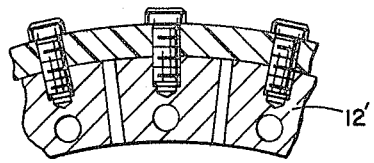
FIGURE 4 is a sectional view of an annular thermally and electrically anisotropic wall structure defining a circular duct.

FIGURE 4 depicts a fragmentary portion of anisotropic wall structure for a circular cross section, high temperature gas channel. FIGURE 4 shows circular sector-shaped, thermally conductive members 12'. It is quite obvious that the thermally conductive members 12' may be square or rectangular in cross section separated by circular sector spacers.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

What is claimed is:

1. A thermally and electrically anisotropic wall structure comprising:
   (a) a plate of electrical insulation;
   (b) a plurality of spaced thermally conductive members supported on said plate with opposing ends defining in part a surface remote from said plate, said thermally conductive members being axially aligned in one direction and including axially aligned passages;
   (c) linking means of electrically non-conducive material having a central passage disposed in adjacent aligned passages for forming a continuous conduit means;
   (d) sealing means between said thermally conductive members and said linking means;
   (e) electrically non-conductive refractory material disposed between said thermally conductive members for defining a continuous surface in cooperation with the opposing ends of said thermally conductive members remote from said plate; and
   (f) fluid inlet and outlet means coupled to opposing ends of said conduit means.

2. A thermally and electrically anisotropic wall structure comprising:
   (a) a plate of electrical insulation;
   (b) a plurality of spaced thermally conductive members supported on said plate with opposing ends defining in part a surface remote from said plate, said thermally conductive members being axially aligned in one direction and including axially aligned passages terminated in enlarged diameter bores;
   (c) linking means comprising an electrically non-conductive sleeve having a central passage disposed in adjacent bores for forming a continuous conduit means;
   (d) sealing means between said thermally conductive members and said linking means;
   (e) electrically non-conductive material disposed between said thermally conductive members for defining a continuous surface in cooperation with the ends of said thermally conductive members remote from said plate; and
   (f) fluid inlet and outlet means coupled to opposing ends of said conduit means.

3. A thermally and electrically anisotropic wall structure comprising:
   (a) a plate of electrical insulation;
   (b) a plurality of spaced thermally conductive members supported on said plate with opposing ends defining in part a surface unit from said plate, said thermally conductive members being axially aligned in one direction and including axially aligned passages terminated in enlarged diameter bores;
   (c) an electrically non-conducting sleeve having a central passage and spaced external circumferential grooves disposed in adjacent bores for forming a continuous conduit means;
   (d) O rings disposed within said circumferential grooves;
   (e) electrically non-conductive material disposed between said thermally conductive members for defining a continuous surface in co-operation with the ends of said thermally conductive members remote from said plate; and
   (f) fluid inlet and outlet means coupled to opposing ends of said conduit means.

4. A thermally and electrically anisotropic wall structure as described in claim 3 which includes in addition spacer means disposed between said thermally conductive members and spaced from said surface.

5. A thermally and electrically anisotropic wall structure as described in claim 3 which includes second sealing means disposed between said plate and said thermally conductive members.

No references cited.

MILTON O. HIRSHFIELD, *Primary Examiner.*

D. X. SLINEY, *Assistant Examiner.*